(No Model.)
M. OFFENBACHER.
MACHINE FOR GRINDING FLAT FACETS.
No. 544,513. Patented Aug. 13, 1895.
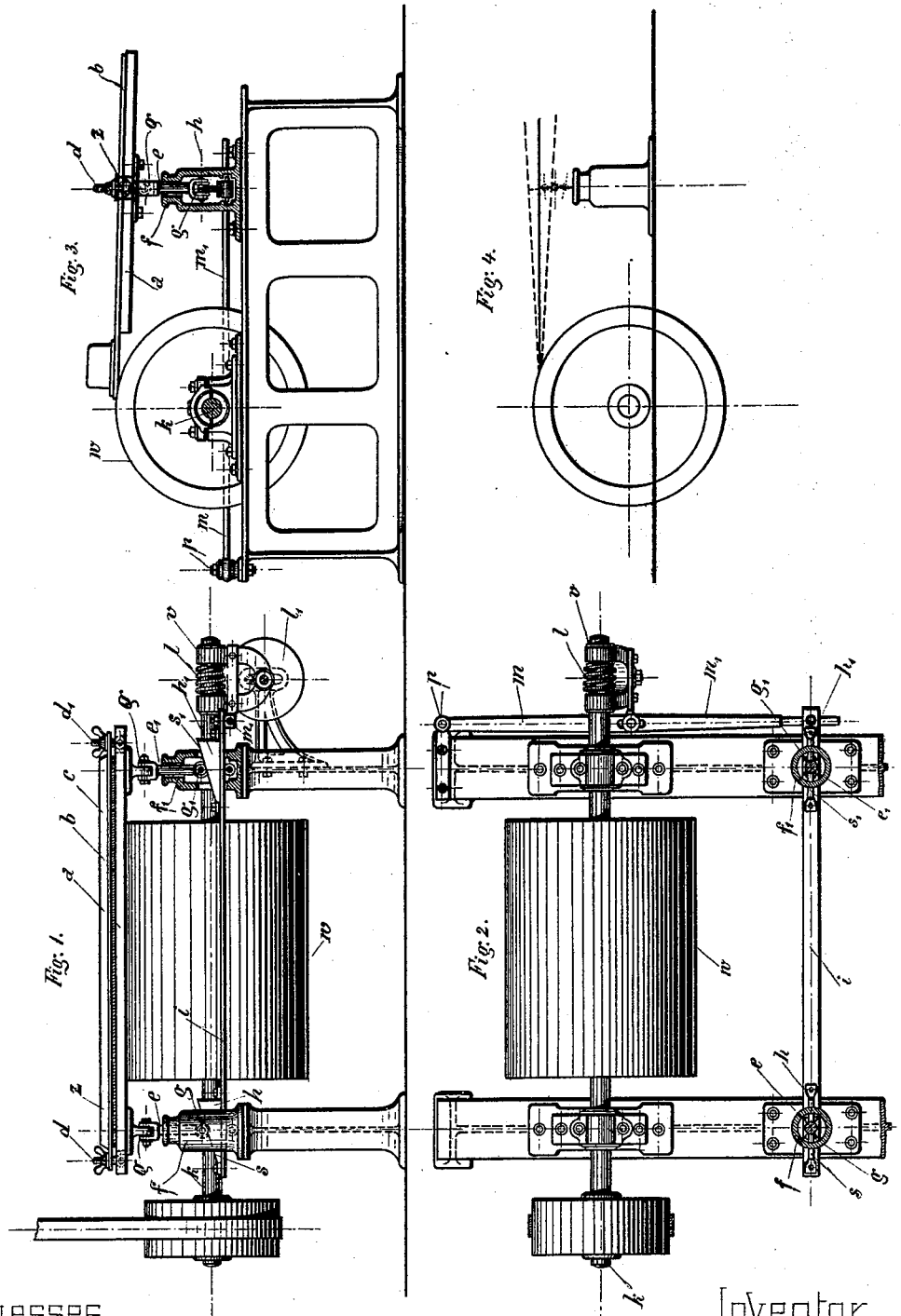
Witnesses
H. D. Hammond.
J. B. Paige
Inventor
Max Offenbacher
By Clarence G. Ridges
Attorney

UNITED STATES PATENT OFFICE.

MAX OFFENBACHER, OF FÜRTH, GERMANY.

MACHINE FOR GRINDING FLAT FACETS.

SPECIFICATION forming part of Letters Patent No. 544,513, dated August 13, 1895.

Application filed July 24, 1894. Serial No. 518,438. (No model.)

*To all whom it may concern:*

Be it known that I, MAX OFFENBACHER, manufacturer, a subject of the German Emperor, residing at Fürth, in the Kingdom of Bavaria, Empire of Germany, have invented certain new and useful Improvements in Machines for Grinding Flat Facets, of which the following is a specification.

This invention relates to a new machine for beveling the edges of glass plates and the like. The cutting of such pieces of glass into facets has been hitherto usually effected by the glass plate being held by hand or fixed by means of mechanical devices with the edge which is to be beveled pressed against the periphery of a cylindrical grinding-roller, thus producing a concave bevel or, more particularly, a so-called "hollow" facet.

This invention has for its object to produce flat facets, instead of the hollow facets, with straight edges. This object is attained by making the table on which the glass plate is fixed at the side of the roller capable of being moved up and down. The inclination, as regards the horizontal plane of the glass plate which is pressed against the roller, and also the point of contact between the glass plate and roller, are consequently constantly altered during a given period, so that the roller always acts in one line on the glass plate and produces no concave facets, but on the other hand flat ones.

The arrangement for carrying out the above-named invention, which arrangement, as already stated, is suitable for the grinding apparatus at present employed, and which may be applied to the same without further alterations, is shown on the accompanying drawings, in which—

Figure 1 is a sectional front elevation; Fig. 2, a sectional plan; Fig. 3, a sectional side elevation, and Fig. 4 a diagram showing the mode of operation.

This apparatus has the following arrangement: The support or table $a$ on which the glass plate $b$, which is to be beveled or faceted, is rigidly fastened by means of a bar $c$, elastic intermediate piece $z$, and two clamp-screws $d$ and $d'$, rests, by means of hinges $q$ and $q'$, on adjustable bars $e$ and $e'$, which bars are vertically arranged in immovable guides $f$ and $f'$. The bars $e$ and $e'$ have slide-rollers $g$ and $g'$ attached to their lower ends, which rollers rest on the inclined surfaces $s$ and $s'$ of wedges $h$ and $h'$. The latter are attached to an adjustable bar $i$ arranged parallel to the axis of the grinding-roller, so that by moving this bar backward and forward the bars $e$ and $e'$, together with the table $a$, are regularly raised and depressed. As a result of this movement, the above-named displacement of the point of contact takes place, and flat facets are ground on the parts which rest on the grinding-roller. The reciprocating movement of the bar $i$ is imparted thereto from the shaft $k$ of the grinding-roller, which latter, as is usual for increasing the polishing action, is moved in an axial direction to and fro by means of a worm-wheel gearing $l$ and $l'$. For this object the bar $i$ is attached to one end of a two-armed lever $m\ m'$, which is connected near its center with the shaft $k$ by being attached to the loop $o$ of the worm-wheel gearing, the other end of the lever being pivoted at $p$.

The above-described arrangement works in the following manner: On the roller $w$ being set in motion the lever $m\ m'$ is simultaneously moved to and fro on its pivot $p$, and consequently the bar $i$, and with it the wedges $h$ and $h'$, are pushed in an axial direction. By the glass plate being supported on these wedges, and consequently being forced to make a compulsory movement, a very exact operation of the device is secured, which is not influenced by any accidents, and breakages of glass are as far as possible prevented. It is of course evident that the usual steps taken for the improvement of the product, such as smoothing and polishing, could also be performed by the new machine and by means of the hereinbefore-described arrangements.

I declare that what I claim is—

1. The combination with a rotating grinding roller, of a plate supporting table, mechanism for raising and lowering said table, and connecting mechanism between the grinding roller and the table elevating mechanism, whereby the table is raised and lowered in unison with the rotation of the grinding roller.

2. The combination, with a grinding roller of a table $a$ with means for securely holding the glass thereon and vertical supports $e$ and $e'$ pivotally supporting said table and resting on inclined surfaces $s$ and $s'$ secured to a bar $i$, which latter receives a reciprocating motion from the shaft $k$ of the grinding roller, and mechanism for giving the bar $i$ such reciprocating motion whereby the supports $e$ and $e'$, and with them the table, are periodically raised and lowered, substantially as and for the purpose described and shown.

In testimony whereof I have signed my name to this specification in the presence of two subscribing witnesses.

MAX OFFENBACHER.

Witnesses:
A. L. CHURBURN,
H. C. CARPENTER.